2,772,255

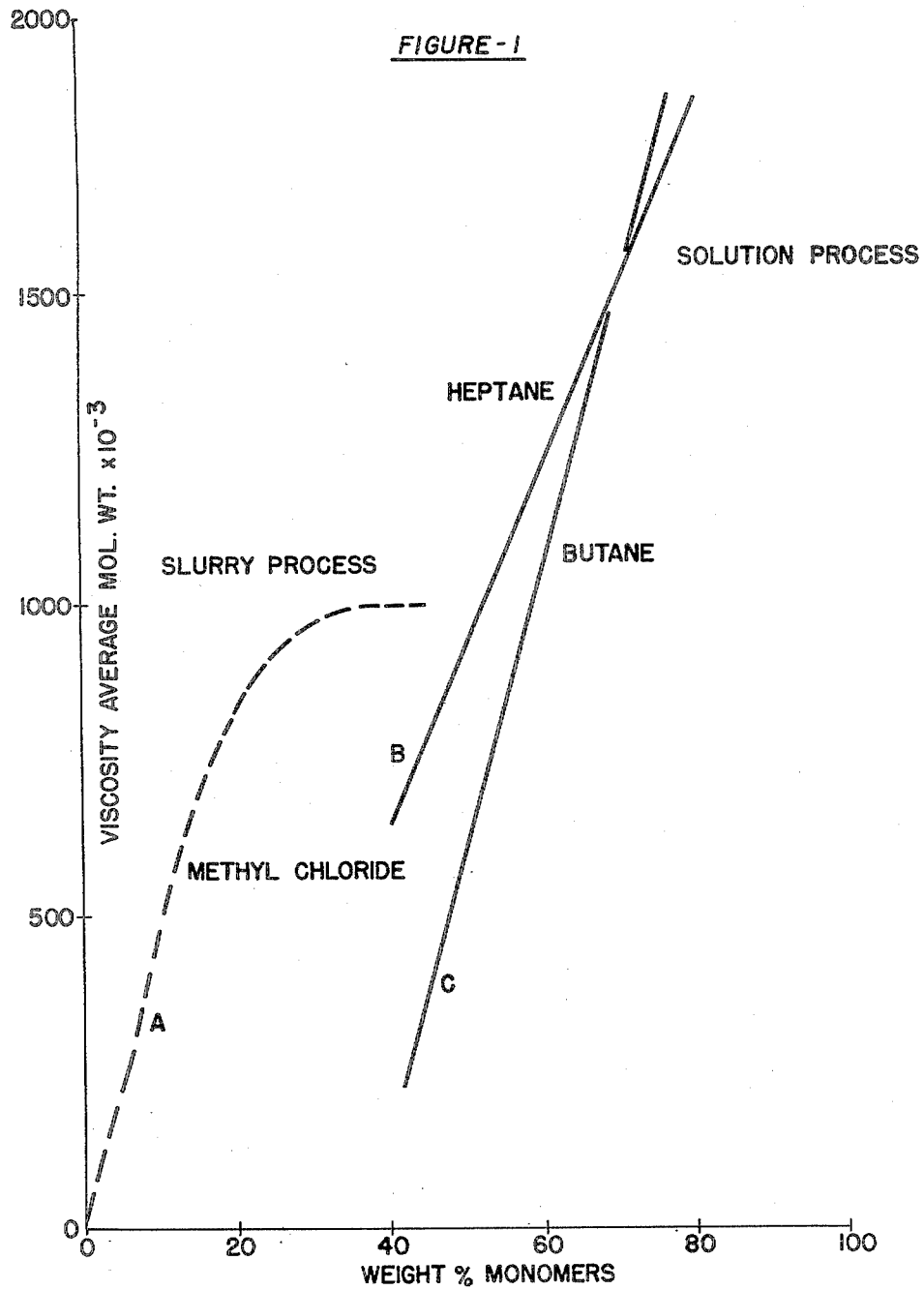

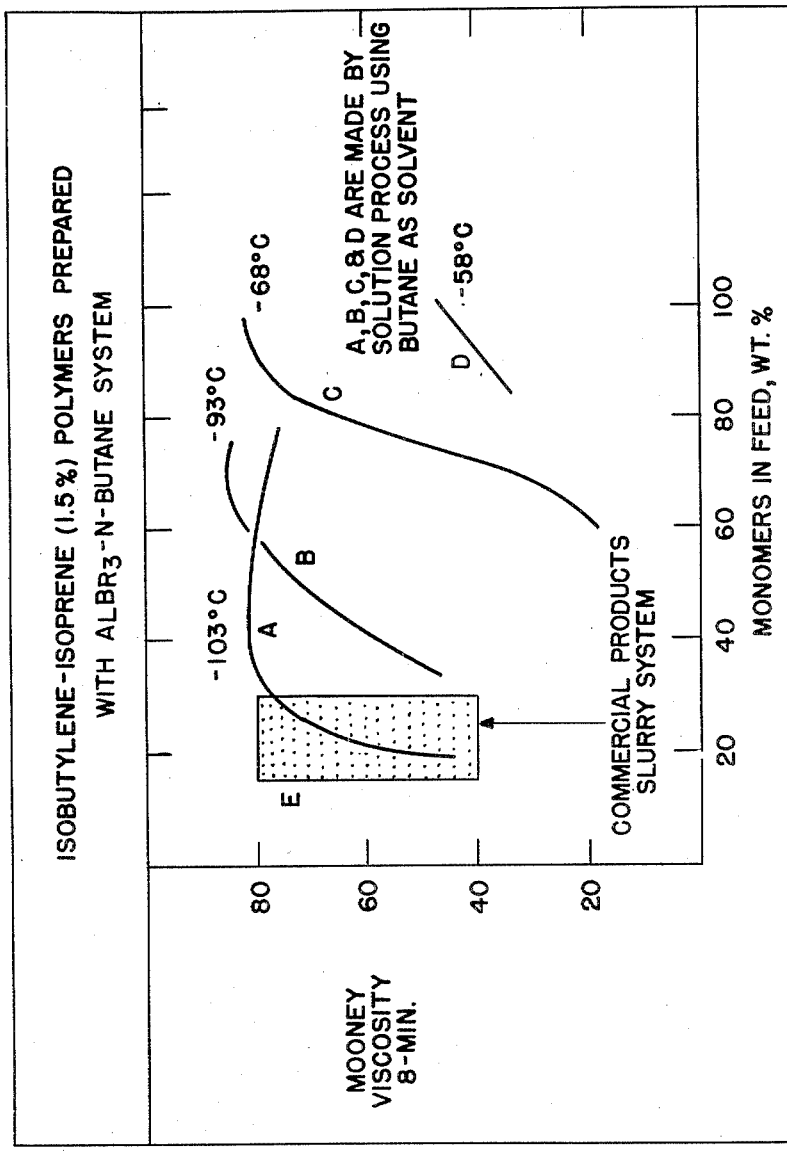

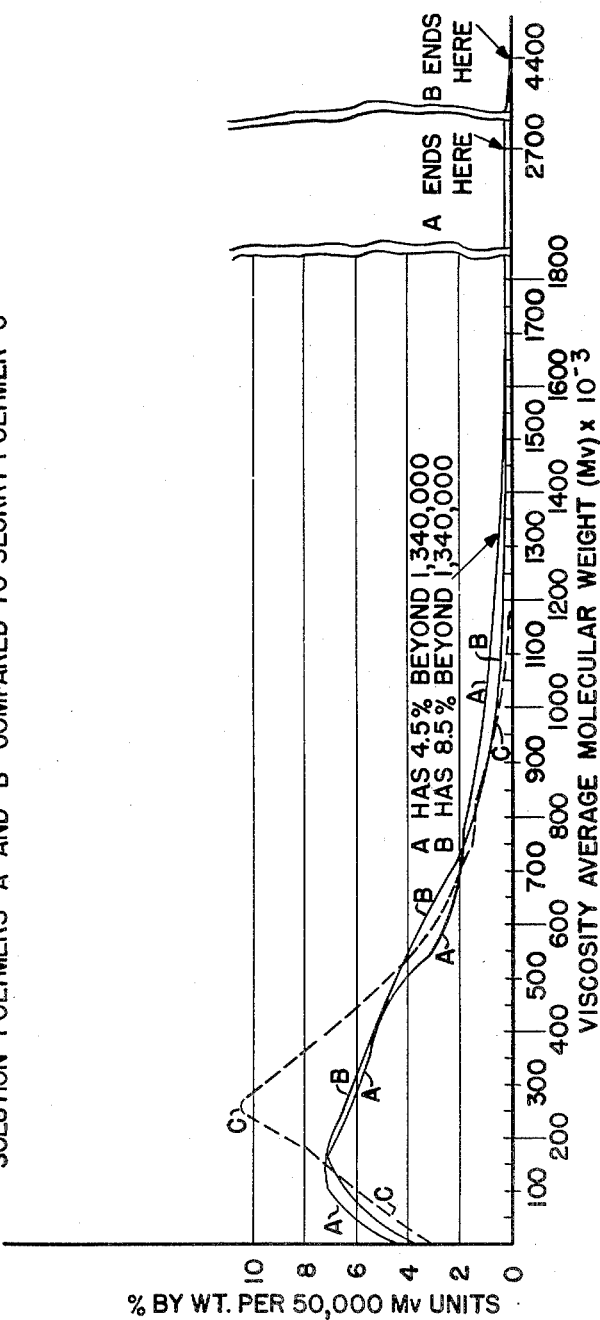

POLYMERIZATION PROCESS

John L. Ernst and Harold J. Rose, Baton Rouge, La., assignors to Esso Research and Engineering Company, a corporation of Delaware Application December 22, 1952, Serial No. 327,274

4 Claims. (Cl. 260—85.3)

This invention relates to a new process for carrying out the copolymerization of isoolefins with aliphatic diolefins, especially in the presence of a solvent for the resulting polymer.

It is already known that high molecular weight vulcanizable synthetic rubber can be made by low temperature Friedel-Crafts copolymerization of isobutylene with a small amount of isoprene or a somewhat larger amount of butadiene, at temperatures below 0° C. The way this process has been carried out commercially heretofore, and as has been described in U. S. Patent 2,356,128 and others, is to mix the reactants in the presence of about 1–5, preferably about 2–3, volumes of an inert diluent, which is preferably methyl chloride, maintaining the entire mixture at a temperature such as —103° C. by the use of liquid ethylene as either internal or external refrigerant, and then effecting the polymerization by adding as catalyst a solution of aluminum chloride in methyl chloride. The resulting polymerization is very rapid and the resulting polymer precipitates out of solution and forms a slurry of finely divided rubber particles suspended in the methyl chloride diluent. Although that process has proved practical and has been used on a large scale, it is quite expensive on account of the cost of refrigeration, unavoidable loss of methyl chloride, and other disadvantages.

Attempts have also been made heretofore to carry out the polymerization in the presence of a liquid diluent which also is a solvent for the resulting polymer but such attempts have not yet proved to be completely satisfactory or sufficiently advantageous.

It has now been found that the solution process, i. e. using a solvent for the polymer, can be made not only practical but unobviously successful in accomplishing some results which could not be obtained heretofore. The present invention comprises the use of a polymerization feed containing about 55–90%, preferably 60–80%, by weight of reactants, the balance being primarily the solvent. The use of such a large proportion of monomers has a number of desirable effects which are quite unexpected. One is that it enables some of the polymerizing molecules to get to a far higher molecular weight than had heretofore been possible either in the slurry process (in which the rubber particles are not soluble in the methyl chloride diluent) or in the solution process in which one to five or six volumes of solvent were used per volume of reactants. Another surprising result of this invention is that products can be obtained having an over-all average molecular weight higher than can be obtained by the prior processes under the same polymerization conditions of temperature and proportions of reactants. A further advantage is that the present invention gives a higher alpha ratio, meaning that whereas in the slurry process only about 50% of the isoprene in the polymerization feed actually combines into the polymer, in the present case about 75% or so of the isoprene combines into the polymer. This permits production of synthetic rubber having a slightly higher unsaturation, which can therefore be cured more readily and to produce higher tensile strength under otherwise similar polymerization conditions. A still further unobvious advantage of this invention is that, particularly due to the small proportion of extremely high molecular weight molecules formed, it is possible to use surprisingly large amounts of mineral oil or other types of plasticizers during compounding without undue sacrifice in strength and other characteristics of the rubber.

In carrying out this invention, the isoolefin to be used should have 4 to 5 carbon atoms; the preferred isoolefin is isobutylene. The alphatic diolefin should preferably have 4 to 6 carbon atoms. Examples of suitable materials include butadiene, isoprene, piperylene, 2-methyl pentadiene, dimethylbutadiene, etc. The amount of diolefin to be used may vary somewhat; for butadiene, about 20 to 80 percent based on olefin or so should be used because it is difficult to make it copolymerize with the isobutylene, but for isoprene and the other diolefins, generally about 1 to 10 percent based on olefin should be used.

The solvent to be used as the reaction diluent should be not only a solvent for the reaction monomers but also a solvent for the resulting polymer. This solvent should preferably be a hydrocarbon liquid of 4 to 8 carbon atoms, and preferably should be substantially free of aromatic and unsaturated constituents. The preferred materials are the paraffin hydrocarbons in which the number of carbon atoms is $$\frac{M}{10} - (1 \text{ to } 2)$$

where M is the percent of monomers. Thus, the particular solvent to be used for best results may vary according to the percent of monomers being used. This will be shown more in detail further herebelow.

The temperature at which the polymerization is carried out should in any event be below about —50° C. and should be sufficiently lower to permit production of polymer having the desired molecular weight, as may be judged for instance by the 8-minute Mooney test. This polymerization temperature should be above the freezing point of the solvent used, but should be below the maximum temperature useable for obtaining a polymer of the desired Mooney value. An approximate guide for determining this temperature is that the temperature in ° C. should be equal to $$\frac{-7500}{M+40}$$

where again M represents the percent monomers used.

It should be noted that the use of high monomer concentrations according to this invention permits carrying out the polymerization at considerably higher temperatures than possible heretofore by prior processes. Thus, a considerable saving in refrigeration costs is made possible.

The catalyst to be used should be soluble in the solvent which is used as reaction diluent. Aluminum bromide is the preferred catalyst because it is hydrocarbon-soluble. Alternatively, various hydrocarbon-soluble Friedel-Crafts catalyst complexes may be used. The concentration of the aluminum bromide or other catalyst should be about 0.1 to 1.5 g./100 ml. and the total amount of catalyst, based on reactants should be about .05 to .006% by weight. The polymerization process may be carried out either batchwise or continuously.

In carrying out the invention it is best to use a sufficient amount of catalyst under the reaction conditions used to obtain a conversion of about 11 to 18 percent by weight based on reactants, and this conversion should for best results be varied inversely according to the percent of monomers used. The preferred amount of conversion may be approximated by the expression $$\frac{1000}{M}$$

In other words, with a very high percent of monomers such as 80%, the percent conversion should not be as high as for a somewhat lower percent of monomers such as 60%. This will be explained more in detail further here below.

The net result of applying the various factors discussed above is that the reaction liquid, after polymerization has been effected to the desired extent will contain about 2 to 15% by weight of polymer. This should preferably be maintained at about 5 to 12 percent by weight.

The resulting polymer may be recovered from the reaction liquid according to any desired method, such as either by directly injecting the entire reaction mixture into hot water to vaporize the solvent and precipitate the polymer in the form of fine particles which may be removed by filtration or other suitable means or the cold reaction liquid may be first passed countercurrent to the incoming feed by heat exchange. The latter procedure reduces costs of refrigeration by 50% or more by cooling the incoming feed mixture by the cold reaction mixture.

The polymer produced according to the present invention has a number of surprising advantages. These will be discussed more in detail in connection with the data given here below and in connection with the accompanying drawings in which Figure 1 is a chart on which the molecular weight is plotted against the percent of monomers used and shows that higher molecular weights are obtained with the high percent of monomers according to this invention than were obtainable with the lower percent monomers used in the prior art; Figure 2 is a chart in which the Mooney viscosity is plotted against the percent monomers used and shows, that higher concentration produces higher Mooney polymer at any particular temperature, or permits polymerizing at higher temperature for any particular Mooney polymer; and Figure 3 is a chart showing the molecular weight distribution of 2 polymers made according to the present invention as contrasted with a prior art, and shows that the latter has a narrower molecular weight spread and lower top molecular weight limit. A number of experiments were carried out in a continuous polymerization equipment in which a diluent was used which was a solvent for the polymer, the tests being carried out with various percentages of monomers and several different solvents, specifically a mixed butane fraction and normal heptane, and at a number of different polymerization temperatures. Table I shows representative data accumulated in those tests, and Figure 1 sets forth graphically some of the more pertinent portions of the data.

TABLE 1

*Relation of mol. wt. of polymer to percent monomers used [1]; manufacture of isobutylene-isoprene synthetic rubber at —95° C.*

|  | Slurry Process | Solution Process | |
|---|---|---|---|
| Reaction Diluent | Methyl Chloride | Butanes | n-Heptane |
| Catalyst Type | AlCl₃ | AlBr₃ | AlBr₃ |
| Catalyst Solvent | Methyl Chloride | Butanes | n-Heptane |
| Temp., °C | —95 | —95 | —95 |

|  | Mol. Wt. (Visc. Aver.) Obtained | | |
|---|---|---|---|
| Percent Monomers: | | | |
| 10 | 475,000 | | |
| 20 | 840,000 | | |
| 30 | 975,000 | | |
| 40 | 1,000,000 | (150,000) | 650,000 |
| 50 | | 620,000 | 940,000 |
| 60 | | 1,080,000 | 1,240,000 |
| 70 | | 1,540,000 | 1,525,000 |
| 80 | | (1,950,000) | 1,800,000 |

[1] All three runs were continuous.

For comparison and contrast data are also given on a slurry process in which the diluent used was methyl chloride, according to the well-known prior commercial process. Figure 1 is a chart on which the viscosity average molecular weight is plotted against the percent monomers (by weight). As clearly evident the dotted line A representing the slurry process shows that it is practically impossible, at the temperature used, i. e., —95° C., to obtain a polymer having a molecular weight greater than about 1,000,000 by the slurry process, and line A also shows, by its termination at about 40 percent monomers that it is not possible to use the slurry process with a concentration of monomers much higher than 40, or possibly 50% by weight. In contrast lines B and C show advantages of the solution process, line B representing the use of heptane as solvent in the solution process, and line C representing the use of butane as solvent, both of these being run in a continuous polymerization equipment. These show that with a concentration of monomers less than about 50 percent the molecular weights obtained are in fact not as high as obtainable with the methyl chloride slurry process, but that, surprisingly, with a concentration of monomers ranging upward from about 55 or 60 percent on up to about 80 or 90 percent, polymers are obtained which have molecular weights far above 1,000,000, i. e., up to 1,800,000 or higher. Lines B and C also show that such increase in molecular weight is directly proportional to the increased concentration of monomers.

Some experimental data are given here below, and summarized in Table 2, and set forth graphically in Figure 2 in the accompanying drawings. These data were all obtained by batch polymerization in a 5-liter reactor, using the solution process, i. e. in this case, an all-hydrocarbon system. Normal butane was used as reaction diluent or solvent, and normal butane was also used as catalyst solvent.

For comparative purposes some data are given on relatively low monomer concentrations ranging from 20 to 50% as representing the general principles of solution process as known heretofore, although relatively little data has been obtained or published along these lines. That data is then followed by a larger number of test runs using higher portions of monomers ranging from 60% upward, according to the present invention.

The use of 100% monomer concentration, i. e. without any reaction diluent generally leads to some disadvantages such as substantial gel formation and more difficulty in handling a polymer and therefore, is not as practical as operation with enough diluent present to maintain a monomer concentration in the range of about 55 to 90%, preferably 60 to 80%.

TABLE 2

*Solution process—Batch polymerization tests [1]; aluminum bromide catalyst; all hydrocarbon system using N-butane diluent*

[Feed: 1.5% isoprene, 98.5% isobutylene.]

| Run No. | Monomer Concen., Wt. Percent | Temp., °C. | Conver., Wt. Percent | Reactor Polymer Concen., Wt. Percent | Catalyst Efficiency [2] | 8' Mooney Viscosity [3] |
|---|---|---|---|---|---|---|
| 1 | 20 | −104 | .21 | 4.2 | 9.3 | 43 |
| 2 | 25 | −103 | 30.8 | 7.7 | 42 | 70 |
| 3 | 30 | −103 | 16.2 | 4.8 | | |
| | | | 25.5 | 7.0 | 100 | 76 |
| 4 | 40 | −103 | 3.4 | 1.3 | | |
| | | | 15.7 | 6.3 | 119 | 85 |
| 5 | 40 | −100 | 13 | 5.2 | 115 | 77 |
| 6 | 50 | −100 | 7.8 | 3.9 | 117 | 79 |
| 7 | 50 | −103 | 7.7 | 3.8 | | |
| 8 | 40 | −93 | 19.6 | 7.7 | 77 | 57 |
| 9 | 50 | −93 | 6.8 | 3.4 | | |
| | | | 15.8 | 7.9 | 103 | 69 |
| 10 | 60 | −104 | 5.9 | 3.6 | | |
| | | | 8.7 | 5.2 | 176 | 80 |
| 11 | 70 | −103 | 4.2 | 2.9 | 80 | 82 |
| 12 | 70 | −101 | 4.6 | 3.2 | 273 | 75 |
| 13 | 80 | −103 | 6.4 | 5.1 | 105 | 72 |
| 14 | 60 | −93 | 11.3 | 6.7 | | |
| | | | 13.4 | 8.0 | 121 | 83 |
| 15 | 70 | −93 | 10.0 | 7.2 | | |
| | | | 11.8 | 8.3 | 205 | 88 |
| 16 | 70 | −93 | 9.3 | 6.5 | 143 | 86 |
| 17 | 80 | −93 | 9.3 | 7.4 | 123 | 83 |
| 18 | 60 | −68 | 10.0 | 6.0 | | |
| | | | 20.0 | 12.0 | 121 | 18 |
| 19 | 70 | −68 | 9.0 | 6.3 | 60 | 33 |
| 20 | 80 | −68 | 6.8 | 5.5 | | |
| | | | 6.1 | 4.9 | 50 | 61 |
| 21 | 80 | −68 | 9.4 | 7.5 | 160 | 63 |
| 22 | 85 | −68 | 3.3 | 2.8 | | |
| | | | 7.2 | 6.1 | 153 | 82 |
| 23 | 85 | −68 | 6.1 | 5.2 | 108 | 71 |
| 24 | 90 | −68 | 8.0 | 7.2 | | |
| | | | 8.1 | 7.3 | 23.3 | 74 |
| 25 | 100 | −68 | 9.5 | 9.5 | 209 | 81 |

[1] All runs made in standard 5 L. batch reactor.
[2] Grams polymer produced/gram of catalyst.
[3] Above 80, the Mooney values may not be reliable, due to slipping.

In Figure 2 of the accompanying drawings, the Mooney viscosity is presented graphically against the percent of monomers in the feed and lines A, B, C, and D are drawn to smooth out the experimental data set forth in Table 2. For comparison, a rectangular area, E, is shown on the chart to represent the general Mooney range of 40 to 80 as made with about 15 to 30% monomers in the commercial methyl chloride slurry system. As indicated in the footnote in Table 2, the Mooney values above 80 may not be reliable due to slipping, and accordingly the upper ends of A, B and C perhaps should go higher.

From the data in Table 2 and Figure 2 it is apparent that the solution process using a low range of monomer concentration, e. g. 20 to 50%, does not offer any special advantage from a Mooney point of view over the commercial slurry process, for polymerization at very low temperatures such as −93 to −103° C. However, the use of a higher monomer concentration, begining just below 60% by weight, shows that higher Mooney values are obtained, for instance, at −93° C., than are actually possible in the methyl chloride slurry process at −103° C., and considerably higher than with the solution process at −93° C. with 30 to 50% monomers. Similarly, at −68° C. the Mooney values are entirely too low to be practical when such lower monomer concentration is used. This means that operation of a solution process with, for instance, 70 to 80% of monomers, can be carried out much more economically due to lower refrigeration costs by use of a moderately low temperature of only −68° C., whereas with 30 to 40% monomers a temperature at least as low as −93° C. would have to be used to obtain a product of the same Mooney value, e. g. in the range of 40 to 60 or more. As apparent from Figure 2 it is even possible to carry out the solution process at temperatures slightly above −68° C., approaching −58° C., by using very high percent monomers in the range of 80 to 90% and still obtain synthetic rubber of a practical Mooney value of at least 40.

A few of the products of the test run shown in Table 2 were also compounded with carbon black, sulfur and accelerators, e. g. Tuads (tetramethylthiuram disulfide) and cured. Data on the cured products are shown herebelow in Table 3.

TABLE 3

*Cure characteristics of isobutylene-isoprene (1.5%) polymer prepared using AlBr₃ catalyst with n-butane as catalyst solvent and feed diluent (compared to GR–I specifications)*

| Run No. | Temp., −°C. | Percent Isoprene in Feed | Monomer Conc., Wt. Percent | Mooney, 8 Min. | 40' Cure @ 307° F. | | |
|---|---|---|---|---|---|---|---|
| | | | | | Tensile | Elong. | 400% Mod. |
| GR–I [1] | ca. 103 | 2.4–2.5 | 20–20 | 40–50 | 2,500 Min | 650 Min | 875–1,125 |
| GR–I–15 [1] | ca. 103 | 2.7–3.0 | 20–30 | 40–50 | 2,400 Min | 550 Min | 1,125–1,375 |
| GR–I–16 | ca. 103 | 2.7–3.0 | 20–30 | 50–60 | 2,400 Min | 550 Min | 1,125–1,375 |
| GR–I–17 | ca. 103 | 2.7–3.0 | 20–20 | 60–70 | 2,400 Min | 550 Min | 1,125–1,375 |
| GR–I–18 | ca. 103 | 2.7–3.0 | 20–0 | 70–80 | 2,400 Min | 550 Min | 1,125–1,375 |
| 1 | 104 | 1.5 | 20 | 43 | 2,525 | 720 | 1,060 |
| 3 | 103 | 1.5 | 30 | 76 | 3,100 | 730 | 1,270 |
| 4 | 103 | 1.5 | 40 | 85 | 3,350 | 670 | 1,500 |
| 7 | 103 | 1.5 | 50 | 81 | 3,300 | 670 | 1,580 |
| 10 | 104 | 1.5 | 60 | 80 | 3,150 | 620 | 1,670 |
| 19 | 68 | 1.5 | 70 | 33 | 2,425 / [2] 2,600 | 770 / 710 | 690 / 1,040 |
| 21 | 68 | 1.5 | 80 | 63 | 2,350 / [2] 2,275 | 670 / 570 | 970 / 1,290 |
| 22 | 68 | 1.5 | 85 | 82 | 3,250 | 700 | 1,310 |
| 24 | 68 | 1.5 | 90 | 74 | 3,100 | 720 | 1,010 |

[1] Specifications on commercial grades of Butyl.
[2] 80 minute cure.

These data show that even at lower isoprene concentrations (1.5% to 2.7–3.0 isoprene ratio to isobutylene in the feed), that sufficient unsaturation is imparted to the polymer to result in a faster curing and higher tensile strength polymer than is obtained in the conventional slurry process.

In order to explain more clearly the relation of the polymerization temperature to percent monomers for any particular concentration of diolefin in the polymerization feed, and to make a polymer having any particular Mooney desired, Table 4 is given herebelow to show approximately the maximum practical temperatures for various percent monomers. These figures are based on actual data of the type shown in Table 2 and Figure 2 but particularly applied for the lowest practical Mooney value of 40, and applied to a polymerization feed containing only 1.5 percent of isoprene. The temperature should be somewhat lower for concentrations of diolefin higher than 1.5 percent of isoprene which is about the lowest commercially usable.

TABLE 4

| Percent Monomers (M) | M+40 | Maximum Usable Temp.° C. $\frac{7500}{M+40}$ |
|---|---|---|
| 55 | 95 | −77 |
| 60 | 100 | −75 |
| 70 | 110 | −68 |
| 80 | 120 | −62 |
| 90 | 130 | −58 |

Thus, the maximum usable temperature rises with increase in percent monomers, and cost of refrigeration is thus reduced.

It has been found that the synthetic rubber products made according to the present invention by the solution process using high monomer concentrations have, in general, higher average molecular weights than similar products made according to the slurry process, or by solution process at lower monomer concentrations, and the new products also surprisingly contain a small amount of extremely high molecular weight polymer molecules which impart unusual characteristics to the entire polymer mixture. These new products also have characteristically different molecular weight distribution. These features are brought out in the molecular weight distribution data shown in Table 5 herebelow, and in the accompanying Figure 3 of the drawings. These data were obtained by fractional precipitation of successive increments of the polymer from the highest molecular weight to the lowest. In the analytical procedures the polymers were dissolved in benzene and precipitated with small incremental additions of acetones as the non-solvent. Two samples of products of this invention were analyzed, referred to as "A" and "B," and for comparison a commercial polymer made by the slurry process, is given, referred to as "C." Table 5 shows the details of the operating conditions used in preparing these polymers and sets forth the molecular weight distribution data.

TABLE 5

| | Present Invention | | Slurry Process C |
|---|---|---|---|
| | A | B | |
| Diluent | Butanes | Butanes | Methyl Chloride. |
| Wt. Percent Monomers in Feed | 80.3 | | 25. |
| Wt. Percent Monomers in Equib | 71.5 | | |
| Wt. Percent Isoprene in Equib | 2.0 | | 2.5. |
| Cat. Type | AlBr | | AlCl₃. |
| solvent | butanes | | meth. chloride. |
| conc. (gms./100 cc.) | 0.30 | | |
| Temp.,° C | 63–78 | 76–79 | −103. |
| Feed rate, cc./min | 725 | 500 | |
| Cat. rate, cc./min | 20–60 | 20–60 | |
| Conversion (on isobut.) | 7.4–9.6 | 9.5–16.4 | |
| Polymer Conc. (wt. percent range aver. (est'd) | 5.3–6.9 6.1 | 6.8–11.7 9.3 | |
| Product 8-Min. Mooney aver. (est'd) | 45–53 49 | 54–60 57 | 40–50. |

MOL. WT. DISTRIBUTION DATA

| | Mol. wt. (Mv.) (visc. aver.) | Percent above 1,340,000 M. W. | Highest M. W. (Est'd) | Peak M. W. | Percent 50,000 M. W. at peak | Percent Cumulative at Peak |
|---|---|---|---|---|---|---|
| A. sol. polymer | 440,000 | 4.2 | 2,700,000 | 125,000 | 7.5 | 15 |
| B. sol. polymer | 580,000 | 8.5 | 4,400,000 | 175,000 | 7.3 | 22 |
| C. GR–I–15 | 370,000 | 0 | 1,200,000 | 275,000 | 10.5 | 40 |

In the accompanying Figure 3, solid lines, A, B, show graphically the molecular weight and distribution of the two products of the invention, whereas dotted line C shows the narrower distribution of the commercial product made by the slurry process. In this figure the points A', B' and C' represent approximately the upper limit of the highest molecular weight particles present in each of the three products. It is thus apparent that both products "A" and "B" contain substantial amounts of very high molecular weight fractions which are completely absent in slurry product "C."

The preferred solvents, as indicated previously should have a number of carbon atoms approximately represented by the expression $$\frac{M}{10} - (1 \text{ to } 2)$$

More specifically this is illustrated in the following table:

TABLE 6

| Percent Monomers (M) | No. of Carbon Atoms |
|---|---|
| 55 | 4 to 5. |
| 60 | 4 to 5. |
| 70 | 5 to 6. |
| 80 | 6 to 7. |
| 90 | 7 to 8. |

The maximum percent conversion to which the polymerization should be carried out should be approximately $$\frac{1000}{M}$$

for example approximate figures are given in the following table:

TABLE 7

*Relation of maximum conversion to percent monomers used*

| Percent Monomers (M) | Approximate Maximum Conversion, Percent |
|---|---|
| 55 | 18.2 |
| 60 | 16.7 |
| 70 | 14.3 |
| 80 | 12.5 |
| 90 | 11.1 |

The synthetic rubber products of this invention have the unusual characteristic of a combination of high molecular weight and toughness which makes it possible to plasticize them with exceptionally large amounts of mineral oil or other suitable plasticizers without undue sacrifice of tensile strength or other desired characteristics. Some data on this feature are shown in the following table:

TABLE 8

|  | GR-I-17 [1] | | | Solution Process Polymer [2] | | | |
|---|---|---|---|---|---|---|---|
| Composition: | | | | | | | |
| Rubber | 100 | 100 | 100 | 100 | 100 | 100 | 100 |
| Plasticizer [3] | 0 | 10 | 15 | 0 | 10 | 15 | 25 |
| Mooney 8-min | 65 | | | 77 | | | 112 |
| Williams Plasticity | 150 | 118 | 109 | 199 | 160 | 139 | 112 |
| Recovery | 21 | 12 | 11 | 66 | 26 | 12 | 6 |
| Extrusion: | | | | | | | |
| In./min | 43 | 46 | 53 | 30 | 27 | 38 | 31 |
| G./min | 87.5 | 91.5 | 93 | 78.5 | 73 | 92.5 | 66.5 |
| G./in | 2.05 | 1.98 | 1.76 | 2.61 | 2.67 | 2.42 | 2.14 |
| Appearance | Rough | Smooth | Smooth | Rough | Rough | Smooth | Smooth |
| Flow Test: | | | | | | | |
| Tot. deformation | 37.2 | 53.2 | 56.9 | 32.2 | 41.9 | 48.8 | 60.7 |
| Flow | 11.0 | 28.7 | 39.1 | 6.3 | 11.5 | 18.4 | 35.9 |
| Cure Properties (40 min.): | | | | | | | |
| Tens. Strength (p. s. i.) | | | 1,500 | | | 1,800 | |
| 300% mod | | | 900 | | | 830 | |
| 400% mod | | | 1,300 | | | 1,170 | |
| Elongation (percent) | | | 450 | | | 580 | |

[1] 2.8% isoprene in feed.
[2] 1.5% isoprene in feed, 85% monomers in n-butane, −63° C., using as cat. AlBr₃ dissolved in n-butane.
[3] Mineral oil (paraffinic, visc. 40 S. S. U./210° F., V. I. 82, ffash point 3.65° F.).

The above data in Table 8 show that the solution process polymer made with high percent monomers, containing a broad molecular weight distribution will tolerate a higher percentage of oil plasticizers than conventional polymers and still maintain good physical properties. This results in a more economical compound for use in rubber products. Thus, it is seen from all of the above data and discussion that the process of this invention, i. e. carrying out the low temperature Friedel-Crafts copolymerization of isobutylene with a small amount of isoprene, or equivalent material, in the presence of a liquid, preferably saturated hydrocarbon, which is a solvent for the polymer, using a high ratio of monomers, e. g., 55–90% preferably 60–80% by weight, not only is actually a new process but effects new and unobvious results in making a synthetic rubber product having a characteristically new molecular weight distribution and range, and other unobvious properties.

It is not intended that this invention be limited to the specific materials and conditions which have been given to illustrate the invention, but only by the appended claims in which it is intended to claim all novelty inherent in the invention as well as all of the modifications coming within the scope and spirit of the invention.

What is claimed is:

1. Process of making synthetic rubber which comprises copolymerizing an isoolefin of 4 to 5 carbon atoms with an aliphatic diolefin of 4 to 6 carbon atoms in the presence of a hydrocarbon liquid which is a solvent for the reacting monomers and for the resulting polymer, using about 60 to 90% by weight of monomers in the polymerization feed, at a temperature below −50° C. and using as catalyst a solution in said same solvent of a substance selected from the group consisting of Friedel-Crafts catalysts and organic complexes thereof.

2. Process of making synthetic rubber having an 8-minute Mooney value of at least 40, which comprises copolymerizing isobutylene with a diolefin of 4 to 6 carbon atoms, in the presence of a hydrocarbon solvent having 4 to 8 carbon atoms and in the presence of a catalyst consisting essentially of aluminum bromide, at a temperature below −55° C., and using about 60 to 80% by weight of monomers in the polymerization feed.

3. The process of making synthetic rubber having an 8-minute Mooney value of at least 40, which comprises copolymerizing about 1 to 5% by weight of isoprene with 99 to 95% of isobutylene, in the presence of a saturated hydrocarbon solvent of 4 to 8 carbon atoms, using specifically a solvent having aproximately a number of carbon atoms represented by the expression $$\frac{M}{10} - (1 \text{ to } 2)$$

at a temperature below −55° C., using an actual temperature between the freezing point of the solvent and a maximum temperature of $$\frac{-7500}{M+40}$$

and carrying out the polymerization to a percent conversion not higher than $$\frac{1000}{M}$$

where M is the percent monomer concentration in the feed and is about 60 to 90, and maintaining a concentration of about 2 to 15% by weight of polymer in the reaction mixture, deactivating the catalyst, and recovering the polymer.

4. Process according to claim 3 in which the polymerization is carried out at a temperature of about −58 to −93° C.

References Cited in the file of this patent

UNITED STATES PATENTS

| 2,644,809 | Saylor | July 7, 1953 |
| 2,681,903 | Linsk | June 22, 1954 |